United States Patent
Gurney et al.

(10) Patent No.: US 11,959,520 B2
(45) Date of Patent: Apr. 16, 2024

(54) GROOVED RESOLVER ROTOR TO PUMP HUB CONNECTION AND METHOD

(71) Applicant: Schaeffler Technologies AG & Co. KG, Herzogenaurach (DE)

(72) Inventors: Nigel Gurney, Wooster, OH (US); Jeremy Jewell, Wooster, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 77 days.

(21) Appl. No.: 17/679,225

(22) Filed: Feb. 24, 2022

(65) Prior Publication Data
US 2023/0265893 A1    Aug. 24, 2023

(51) Int. Cl.
*F16D 1/112*    (2006.01)
*F16H 41/28*    (2006.01)

(52) U.S. Cl.
CPC ............ *F16D 1/112* (2013.01); *F16H 41/28* (2013.01)

(58) Field of Classification Search
CPC .... F16D 33/18; F16H 41/24; Y10T 29/49236; Y10T 29/49321
USPC .................................... 60/330–367
See application file for complete search history.

(56) References Cited

U.S. PATENT DOCUMENTS

| | | | | |
|---|---|---|---|---|
| 1,381,805 A * | 6/1921 | Crewdson | ............... | D01D 7/02 57/77 |
| 2,297,390 A * | 9/1942 | Burger | ............... | F16D 1/06 403/350 |
| 2,420,429 A * | 5/1947 | Jandasek | ............... | F16H 61/56 60/354 |
| 3,149,467 A * | 9/1964 | Knowles | ............... | F16H 61/58 60/362 |
| 4,577,737 A * | 3/1986 | Niikura | ............... | F16H 61/143 192/3.3 |
| 5,980,208 A * | 11/1999 | Szuba | ............... | F16H 41/30 60/330 |
| 6,604,885 B1 * | 8/2003 | Neuner | ............... | F16D 1/06 29/889.22 |
| 7,223,074 B2 * | 5/2007 | Rydberg | ............... | B63H 23/34 416/198 R |
| 8,181,454 B2 * | 5/2012 | Bartos | ............... | F16H 41/30 60/358 |
| 8,348,542 B2 * | 1/2013 | Church | ............... | F16L 37/025 403/314 |
| 8,739,524 B2 * | 6/2014 | Brees | ............... | F16D 1/101 60/330 |

(Continued)

*Primary Examiner* — Topaz L. Elliott
*Assistant Examiner* — Ryan C Clark
(74) *Attorney, Agent, or Firm* — Volpe Koenig

(57) ABSTRACT

A method of assembling a resolver rotor to a hub of a transmission assembly is provided. The method includes: forming a generally axially extending groove in an outer surface of the hub, the groove extending at an assembly angle greater than 0 degrees relative to an axial direction from a hub end toward a hub base, the assembly angle being positive in a direction that is opposite to a rotation direction of the hub in use; forming a projection on an inner surface of the resolver rotor, the projection being configured to have an interference fit with the groove upon assembly; and assembling the resolver rotor onto the hub with the at least one projection traveling along and interfering with a portion of the at least one groove as the resolver rotor moves to a seated position toward the hub base. A transmission assembly is also provided.

15 Claims, 3 Drawing Sheets

(56) References Cited

U.S. PATENT DOCUMENTS

| | | | |
|---|---|---|---|
| 9,228,653 B2* | 1/2016 | Botez | F16H 57/043 |
| 9,322,467 B2* | 4/2016 | Biermann | F16H 57/0482 |
| 2006/0037313 A1* | 2/2006 | Chicky | F16H 41/24 |
| | | | 60/330 |
| 2017/0037895 A1* | 2/2017 | Takanashi | F16C 3/023 |

* cited by examiner

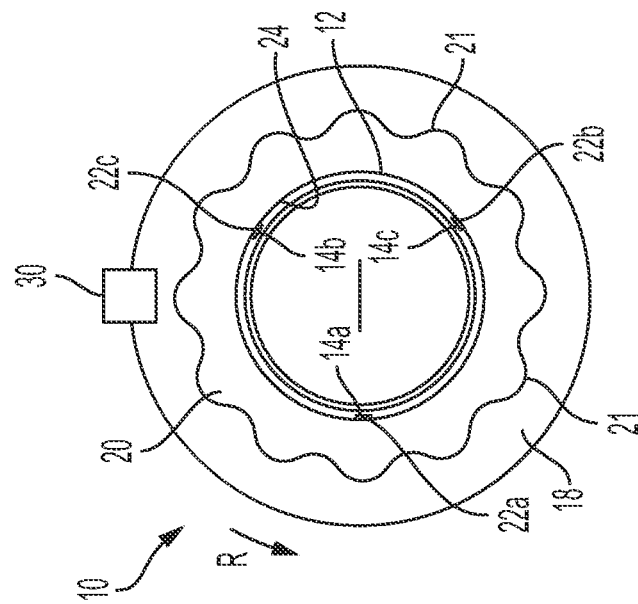
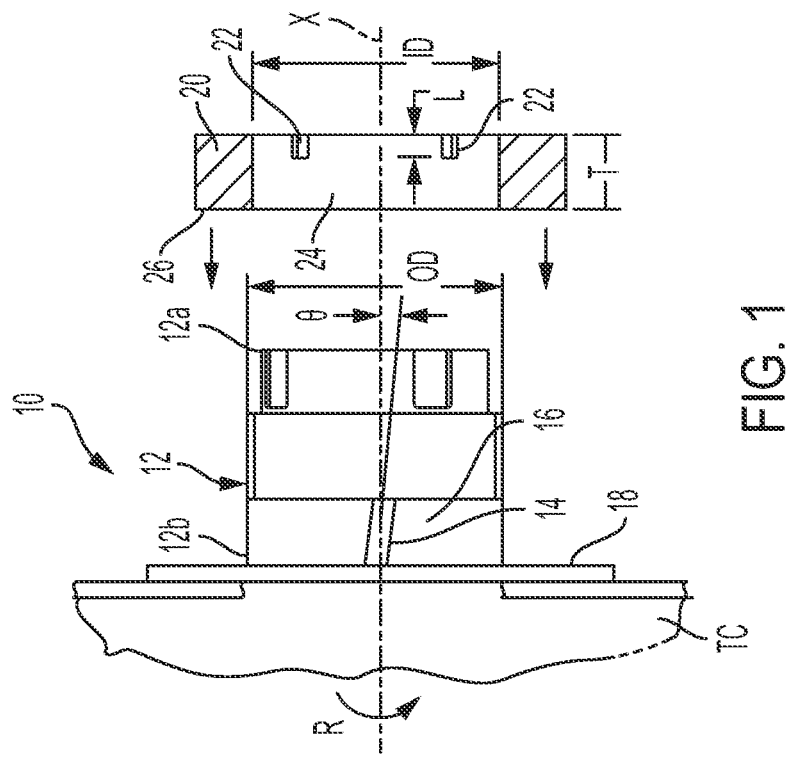

GROOVED RESOLVER ROTOR TO PUMP HUB CONNECTION AND METHOD

FIELD OF INVENTION

The disclosure relates to a transmission that includes an improved construction arrangement and assembly method for the resolver connection to the torque converter pump hub.

BACKGROUND

In various hybrid architectures, an electric motor (emotor) is integrated into the drivetrain with the rotor directly engaged with the crankshaft of the internal combustion engine (ICE), and torque from the emotor and/or the ICE is transmitted via a transmission assembly that includes a torque converter to the transmission gear box.

For operation, it is necessary to determine the rotary position of the input into the torque converter, which can be done with a position sensor including a resolver rotor that is attached to the hub affixed to the torque converter cover. Previously, it has been known to use a press-fit, a heat and cool shrink fit, a super-cooled hub fit, welding or staking to connect the resolver rotor to the hub. However, these all require either extremely tightly controlled tolerances to effectively hold the parts together without damage or have the risk of warping or damaging the resolver rotor and/or the hub during assembly using such processes since both the hub and resolver are finished parts.

It would be desirable to find a cost-effective solution to these issues that improves quality without substantially affecting costs, weight or assembly time.

SUMMARY

In one aspect, a method of assembling a resolver rotor to a hub of a transmission assembly is provided. The method includes: forming at least one generally axially extending groove in an outer surface of the hub, the at least one groove extending at an assembly angle greater than 0 degrees relative to an axial direction from a hub end toward a hub base, the assembly angle being positive in a direction that is adapted to be opposite to a rotation direction of the hub; forming at least one projection on an inner surface of the resolver rotor, the at least one projection being configured to have an interference fit with the at least one groove upon assembling of the resolver rotor onto the hub; and assembling the resolver rotor onto the hub with the at least one projection traveling along and interfering with a portion of the at least one groove as the resolver rotor moves to a seated position toward the hub base.

With this assembly, the assembly angle of the groove is very shallow relative to the axis, so that very little rotational movement is required for assembly, but the angle is sufficient to act as restraint to untwisting of the resolver rotor off the hub. Additionally, the clockwise or anti-clockwise direction of the groove assembly angle works so that operational torque of the hub will act to "lock" the resolver rotor against a stop shoulder of the hub.

Preferably, the at least one groove extends helically at the assembly angle. The assembly angle is preferably in a range of 0.5° to 30°. More preferably the assembly angle is 1.0° to 15°.

In one embodiment, the at least one groove comprises at least two of the grooves, and the at least one projection comprises at least two of the projections, and the at least two grooves and the at least two projections are respectively spaced apart equally in a circumferential direction. In a particularly preferred embodiment, three of the grooves and three of the projections are provided.

Preferably, an outer surface of the hub and an inner surface of the resolver rotor have a sliding fit in an area or areas other than an area of the at least one groove and the at least one projection. This provides for centering of the resolver rotor on the hub. The sliding fit may be a clearance of 0.0005 to 0.0050 inches. However, a greater clearance could be provided depending on the application and the size of these parts.

In a preferred arrangement, the seated position corresponds to a position in which an axial face of the resolver rotor contacts an opposing axial surface of the hub that acts as a stop shoulder.

In one preferred arrangement, the resolver rotor has a thickness in the axial direction, and the at least one projection has a length in the axial direction that is less than the thickness such that a projection free portion of the inner surface of the resolver rotor is initially guided onto the outer surface of the hub. This allows for easier assembly.

In another aspect, a transmission assembly is provided having a hub adapted to be connected to a torque converter cover, with the hub including at least one generally axially extending groove in an outer surface thereof, the at least one groove extending at an assembly angle greater than 0 degrees relative to an axial direction from a hub end toward a hub base. The assembly angle is positive in a direction that is adapted to be opposite to a rotation direction of the hub in use. A resolver rotor is connected to the hub, with the resolver rotor including at least one projection on an inner surface thereof, the at least one projection being configured to have an interference fit with the at least one groove upon assembling of the resolver rotor onto the hub.

Preferably, the at least one groove extends helically at the assembly angle.

The assembly angle is preferably in a range of 0.5° to 30°. More preferably the assembly angle is 1.0° to 15°.

In one arrangement, the at least one groove comprises at least two of the grooves, and the at least one projection comprises at least two of the projections, and the at least two grooves and the at least two projections are respectively spaced apart equally in a circumferential direction.

Preferably, an outer surface of the hub and an inner surface of the resolver rotor have a sliding fit in an area other than an area of the at least one groove and the at least one projection.

In one preferred arrangement, the resolver rotor has a thickness in the axial direction, and the at least one projection has a length in the axial direction that is less than the thickness such that a projection free portion of the inner surface of the resolver rotor is initially guided onto the outer surface of the hub.

In the disclosed embodiments, the resolver rotor is rotated relative to the hub as the resolver rotor moves to a seated position toward the hub base.

Various features of disclosed herein can be used alone or in combination in order to achieve one or more of the benefits described herein.

BRIEF DESCRIPTION OF THE DRAWINGS

The foregoing Summary and the following detailed description will be better understood when read in conjunction with the appended drawings, which illustrate preferred embodiments according to the disclosure. In the drawings:

FIG. 1 is a side view, partially shown in cross section, showing the assembly of one embodiment of a resolver rotor to a hub of a transmission assembly.

FIG. 2 is an end view showing the assembled state of the resolver rotor on the transmission hub.

DETAILED DESCRIPTION

Figure 3:
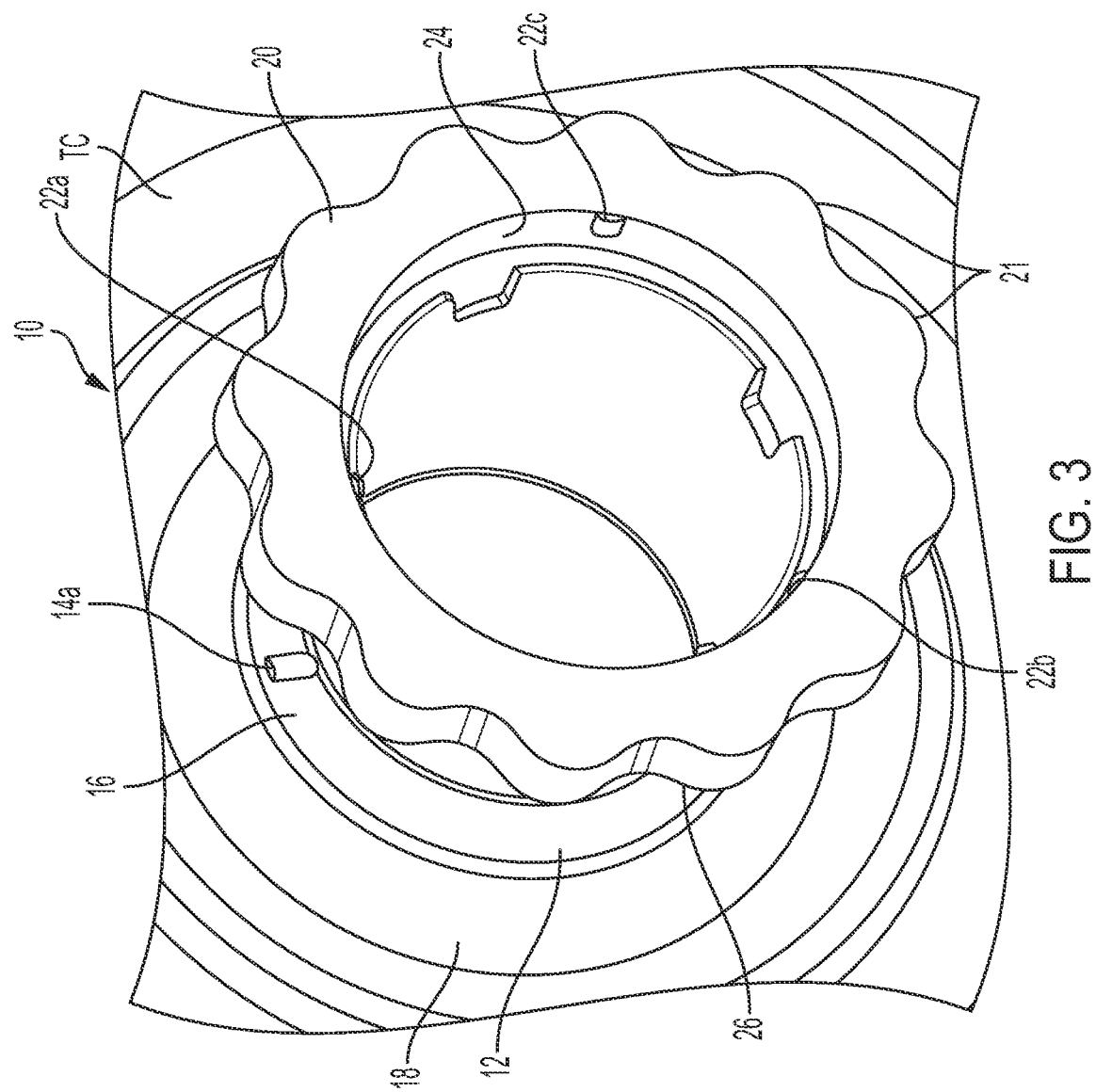
FIG. 3 is a perspective view, partially exploded, showing the resolver rotor being positioned for assembly onto the hub of a transmission assembly.

Certain terminology is used in the following description for convenience only and is not limiting. The words "inwardly" and "outwardly" refer to directions toward and away from the parts referenced in the drawings. "Axially" refers to a direction along the axis of a shaft. "Generally axially" refers to a feature that extends more prevalently in an axial direction with some deviation—for example within + or −20° of a true axial direction. "Radially" refers to a direction normal to an axis. A reference to a list of items that are cited as, for example, "at least one of a or b" (where a and b represent the items being listed) means any single one of the items a or b, or a combination of a and b thereof. This would also apply to lists of three or more items in like manner so that individual ones of the items or combinations thereof are included. The terms "about" and "approximately" encompass + or −10% of an indicated value unless otherwise noted. The terminology includes the words specifically noted above, derivatives thereof and words of similar import.

Referring to FIGS. 1-4, a method of assembling a resolver rotor 20 to a hub 12 of a transmission assembly 10 will be described.

Figure 4:
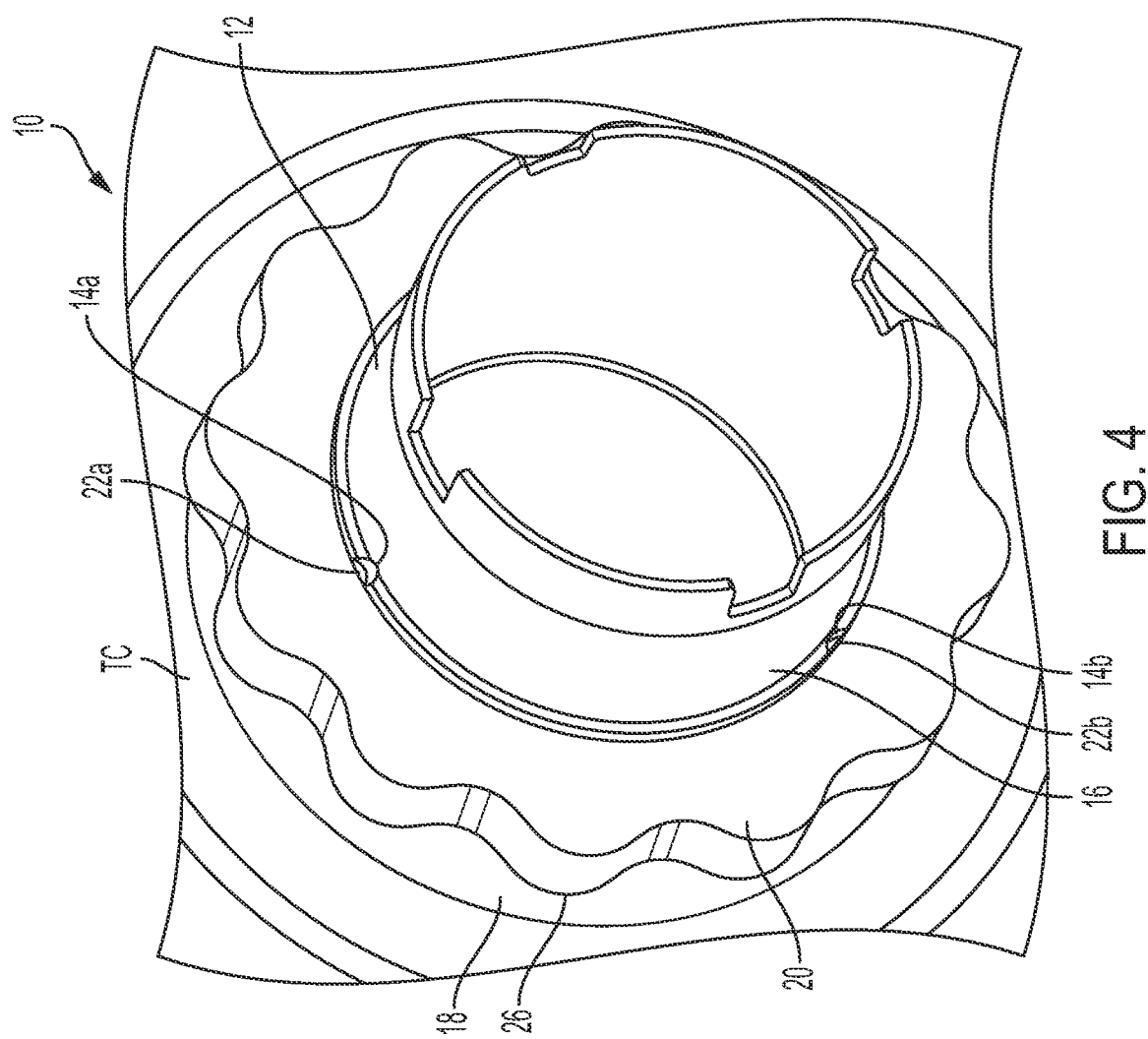
FIG. 4 is a perspective view similar to FIG. 3 showing the assembled state of the resolver rotor on the hub of the transmission assembly.

The method includes forming at least one generally axially extending groove indicated as 14 in FIG. 1 and as 14a-c in FIGS. 2-4 on an outer surface 16 of the hub 12. The at least one groove 14a-14c extends at an assembly angle Θ greater than zero degrees relative to an axial direction X from a hub end 12a toward a hub base 12b of the hub 12. The assembly angle Θ is in a positive direction that is adapted to be opposite a rotation direction R of the hub 12 in use, indicated in FIGS. 1 and 2. In a preferred embodiment, the at least one groove 14a-14c extends helically at the assembly angle Θ. In a preferred embodiment, the assembly angle is between 0.5 degrees to 30 degrees. While at least one groove 14 can be used, in a preferred arrangement, there are at least two of the grooves 14a-14c, and more preferably three of the grooves 14a-14c that are spaced apart equally in a circumferential direction on the outer surface 16 of the hub 12.

The method further includes forming at least one projection 22, and more preferably at least two projections 22a-22c on an inner surface 24 of the resolver rotor 20. The at least one projection 22a-22c is configured to have an interference fit with the at least one groove 14a-14c upon assembling of the resolver rotor onto the hub 12.

As shown in FIGS. 1 and 2, in a preferred embodiment there are three of the projections 22a-22c that are respectively spaced apart equally in a circumferential direction and corresponds to the three grooves 14a-14c on the hub 12.

As shown in FIG. 2, the resolver rotor 20 preferably includes sensor lobes 21 that are adapted to be a sensed via a sensor 30 which can detect a change in a magnetic field caused by the size and/or spacing of the lobes 21 as they pass by the sensor 30. This allows at least one of the position or speed of the hub 12 to be determined.

The resolver rotor 20 is assembled onto the hub 12 with the at least one projection 22 traveling along and interfering with a portion of the at least one groove 14 as the resolver rotor 20 moves to a seated position toward the hub base 12b of the hub 12.

Preferably the outer surface 16 of the hub 12 and an inner surface 24 of the resolver rotor 20 have a sliding fit in an area other than an area of the at least one groove 14a-14c and the at least one projection 22a-22c. This sliding fit is a clearance between the OD (outside diameter) of the portion of the outer surface 16 of the hub 12, on which the resolver rotor 20 is seated, and the ID (inside diameter) of the opening in the resolver rotor 20. The sliding fit is preferably a clearance of 0.0005-0.005 inches. However, this can be greater, depending upon the size of the parts. It is noted that the hub 12 is shown with a stepped outer surface; however, this is not required.

Referring to FIGS. 2 and 4, when the resolver rotor 20 is in the seated position, an axial face 26 (indicated in FIG. 1) of the resolver rotor 22 contacts an opposing axial surface 18 of the hub 12. While the axial surface 18 is illustrated as the hub attachment surface in FIG. 1, it could be formed as separate step or shoulder (not shown) spaced from the axial surface 18.

Preferably, the resolver rotor 20 has a thickness T as indicated in FIG. 1 in the axial direction X, and the at least one projection 22a-22c has a length L in the axial direction X that is less than the thickness T such that a projection free portion of the inner surface 24 of the resolver rotor 20 is initially guided onto the outer surface 16 of the hub 12 in the region that includes the at least one groove 14a-14c prior to the at least one projection 22a-22c arriving at the entrance to the at least one groove 14a-14c. This assists in the assembly process.

The assembly process may also comprise rotating the resolver rotor 20 relative to the hub 12 as the resolver 20 moves to the seated position towards the hub based 12b. This can be done to assist in assembly with rotation corresponding to the assembly angle Θ. Alternatively, merely pressing the resolver rotor 20 downwardly relative to the hub 12 can cause the resolver rotor 20 to rotate automatically by the assembly angle Θ as it moves towards the seated position based on the configuration of the at least one groove 14a-14c.

Still with reference to FIGS. 1, 2, and 4, a finished transmission assembly 10 formed by the hub 12 and the resolver rotor 20 is also provided. The hub 12 is adapted to be connected to a torque converter cover in the preferred application, and includes the at least one generally axially extending groove 14a-14c in an outer surface 16 thereof, as noted above. The at least one groove 14 extends at the assembly angle Θ that is greater than zero degrees relative to the axial direction X from the hub end 12a toward the hub base 12b. The assembly angle Θ is positive in a direction that is adapted to be opposite to the rotation direction R of the hub in use. The resolver rotor 20 is connected to the hub 12 via an interference fit between the at least one groove 14a-14c and the at least one projection 22a-22c on the inner surface 24 of the resolver rotor 20 upon assembling of the resolver rotor 20 onto the hub 12. The sensor 30 can be mounted in any suitable position adjacent to the circumferential surface of the resolver rotor 20, for example as shown in FIG. 2, in order to form a rotational position and/or speed sensor.

The configuration of the at least one groove 14a-14c as well as the projections 22a-22c are as discussed above in connection with the assembly method.

This transmission assembly 10 including the resolver rotor 20 and the hub 12 as described above provides advantages with respect to not only precise positioning of the resolver rotor 20 on the hub 12, but also eliminates the prior known issues with an interference fit and/or shrink fit of the resolver rotor 20 inner surface 24 onto the outer surface 16 of the hub 12 which resulted in either damage to the resolver rotor or the hub or a fit that was too loose, resulting in a resolver rotor 20 either moving relative to the hub 12 or becoming dislodged.

Having thus described the presently preferred embodiments in detail, it is to be appreciated and will be apparent to those skilled in the art that many physical changes, only a few of which are exemplified in the detailed description, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope that is indicated by the appended claims rather than by the foregoing description, and all alternate embodiments and changes to this embodiment which come within the meaning and range of equivalency of said claims are therefore to be embraced therein.

LIST OF REFERENCE SYMBOLS 10 transmission assembly
12 hub
12a hub end
12b hub base
14, 14a-14c generally axially extending groove
16 outer surface
18 axial surface
20 resolver rotor
21 sensor lobes
22, 22a-c projection
24 inner surface
26 axial face
30 sensor
Θ assembly angle
L length of 22, 22a-c
T thickness of 20
TC torque converter
X axial direction

The invention claimed is:

1. A method of assembling a resolver rotor to a hub of a transmission assembly, the method comprising:
forming at least one generally axially extending groove in an outer surface of the hub, the at least one groove extending at an assembly angle greater than 0 degrees relative to an axial direction from a hub end toward a hub base, the assembly angle being positive in a direction that is adapted to be opposite to a rotation direction of the hub;
forming at least one projection on an inner surface of the resolver rotor, the at least one projection being configured to have an interference fit with the at least one groove upon assembling of the resolver rotor onto the hub; and
assembling the resolver rotor onto the hub with the at least one projection traveling along and interfering with a portion of the at least one groove as the resolver rotor moves to a seated position toward the hub base;
wherein, during the assembling of the resolver rotor onto the hub, a projection free portion of the inner surface of the resolver rotor is initially guided onto the outer surface of the hub.

2. The method of claim 1, wherein the at least one groove extends helically at the assembly angle.

3. The method of claim 2, wherein the assembly angle is 0.5° to 30°.

4. The method of claim 1, wherein the at least one groove comprises at least two of the grooves, and the at least one projection comprises at least two of the projections, and the at least two grooves and the at least two projections are respectively spaced apart equally in a circumferential direction.

5. The method of claim 1, wherein an outer surface of the hub and an inner surface of the resolver rotor have a sliding fit in an area other than an area of the at least one groove and the at least one projection.

6. The method of claim 1, wherein the seated position corresponds to a position in which an axial face of the resolver rotor contacts an opposing axial surface of the hub.

7. The method of claim 1, wherein the resolver rotor has a thickness in the axial direction, and the at least one projection has a length in the axial direction that is less than the thickness, defining the projection free portion of the inner surface of the resolver rotor.

8. The method of claim 1, further comprising rotating the resolver rotor relative to the hub as the resolver rotor moves to the seated position toward the hub base.

9. A transmission assembly, comprising:
a hub adapted to be connected to a torque converter cover, the hub including at least one generally axially extending groove on an outer surface thereof, the at least one groove extending at an assembly angle greater than 0 degrees relative to an axial direction from a hub end toward a hub base, the assembly angle being positive in a direction that is adapted to be opposite to a rotation direction of the hub; and
a resolver rotor connected to the hub, the resolver rotor including at least one projection on an inner surface thereof, the at least one projection being configured to have an interference fit with the at least one groove upon assembling of the resolver rotor onto the hub, wherein the resolver rotor is positioned adjacent a sensor configured to detect a rotational position or speed of the hub;
wherein, during the assembling of the resolver rotor onto the hub, a projection free portion of the inner surface of the resolver rotor is initially guided onto the outer surface of the hub.

10. The transmission assembly of claim 9, wherein the at least one groove extends helically at the assembly angle.

11. The transmission assembly of claim 10, wherein the assembly angle is 0.5° to 30°.

12. The transmission assembly of claim 9, wherein the at least one groove comprises at least two of the grooves, and the at least one projection comprises at least two of the projections, and the at least two grooves and the at least two projections are respectively spaced apart equally in a circumferential direction.

13. The transmission assembly of claim 9, wherein an outer surface of the hub and an inner surface of the resolver rotor have a sliding fit in an area other than an area of the at least one groove and the at least one projection.

14. The transmission assembly of claim 9, wherein the resolver rotor has a thickness in the axial direction, and the at least one projection has a length in the axial direction that is less than the thickness.

15. The transmission assembly of claim 9, wherein the resolver rotor is rotated relative to the hub as the resolver rotor moves to a seated position toward the hub base.

\* \* \* \* \*